Jan. 28, 1941.                    C. HOHL                    2,229,653
                                  TRAILER
                            Filed Feb. 28, 1939                3 Sheets-Sheet 1
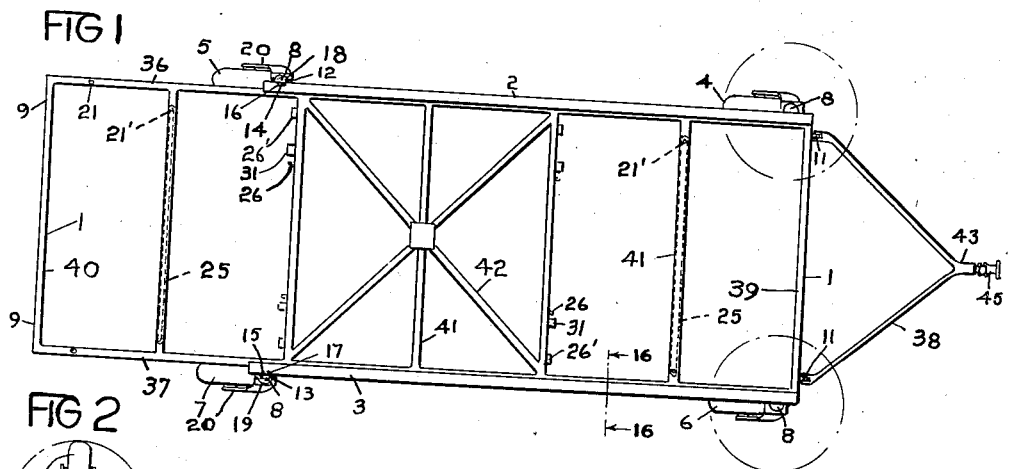
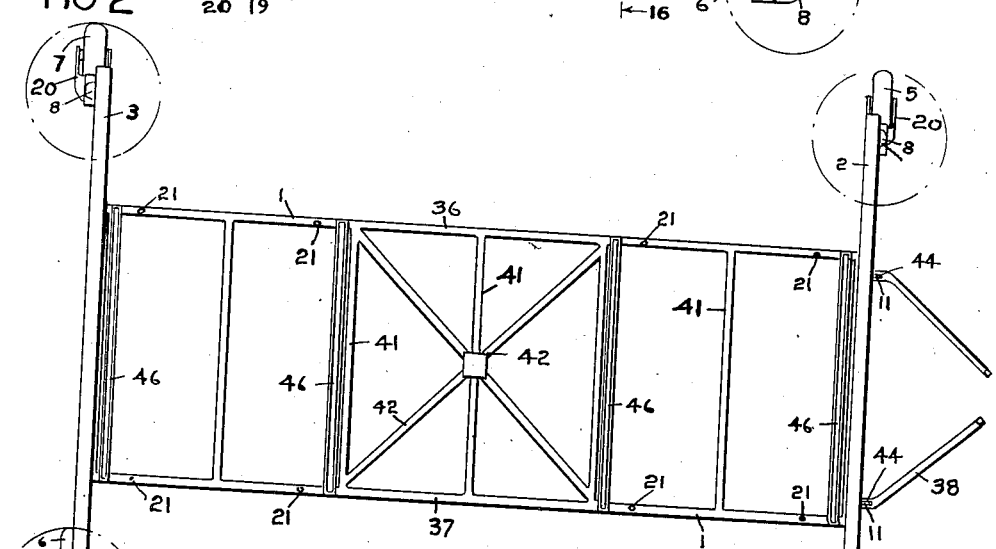
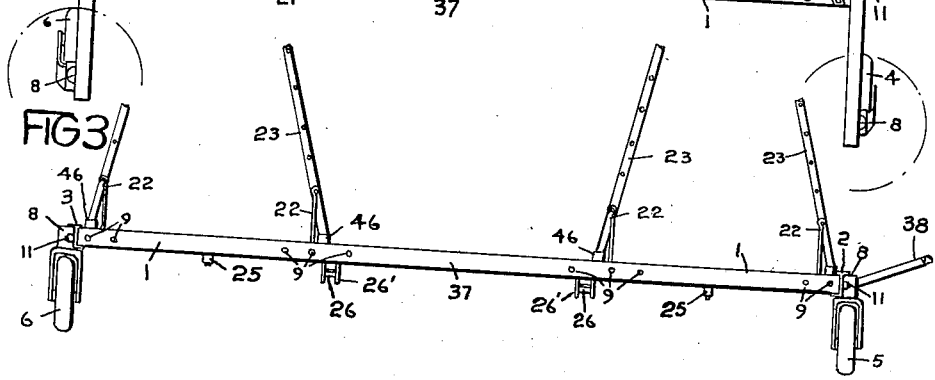
INVENTOR.
CHARLES HOHL.
BY Paul A. Talbot.
ATTORNEY.

Jan. 28, 1941.   C. HOHL   2,229,653
TRAILER
Filed Feb. 28, 1939   3 Sheets-Sheet 2
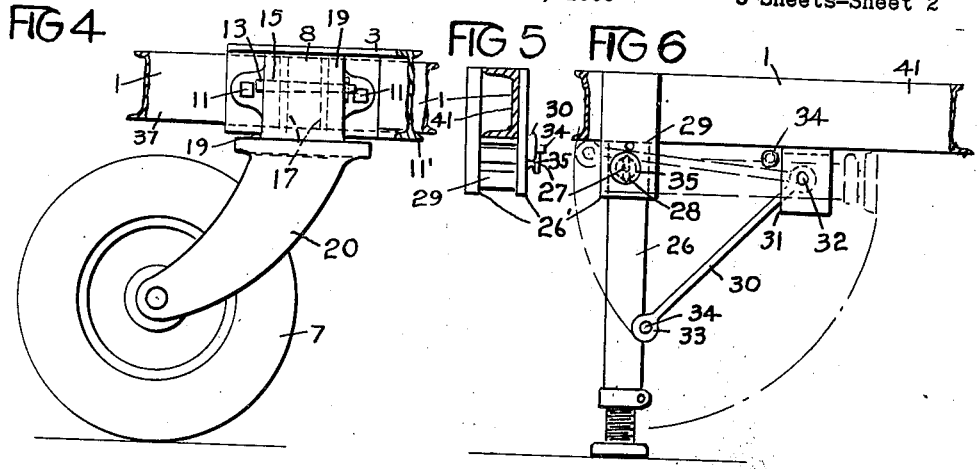
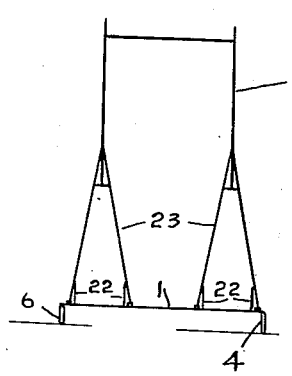
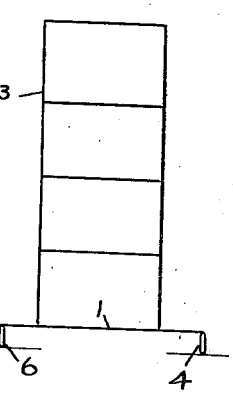
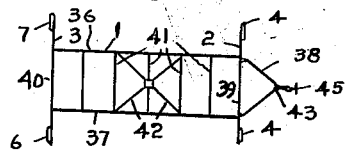
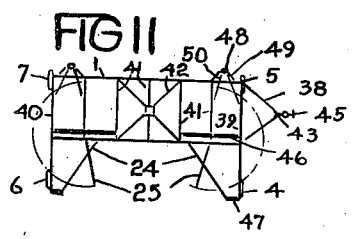
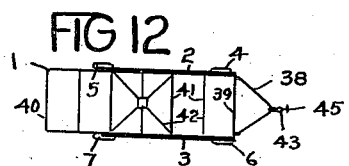
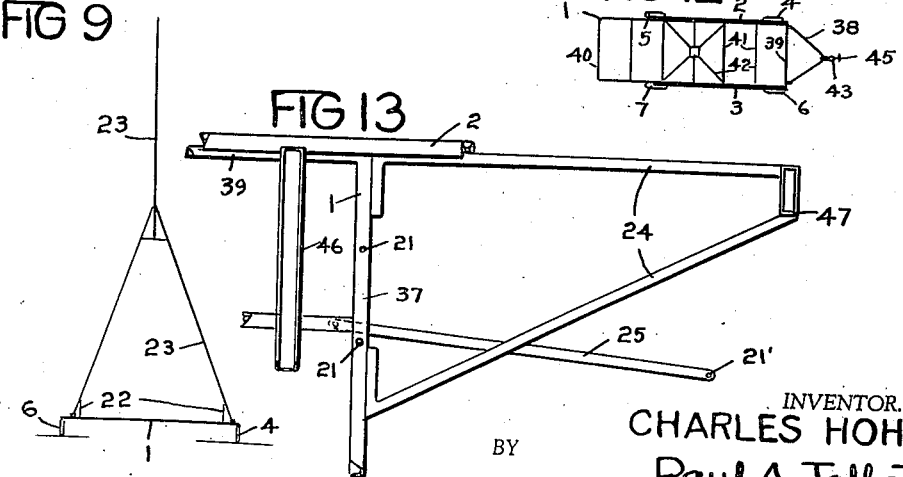
INVENTOR.
CHARLES HOHL
BY Paul A. Talbot
ATTORNEY.

Jan. 28, 1941.              C. HOHL                2,229,653
                            TRAILER
                      Filed Feb. 28, 1939          3 Sheets-Sheet 3
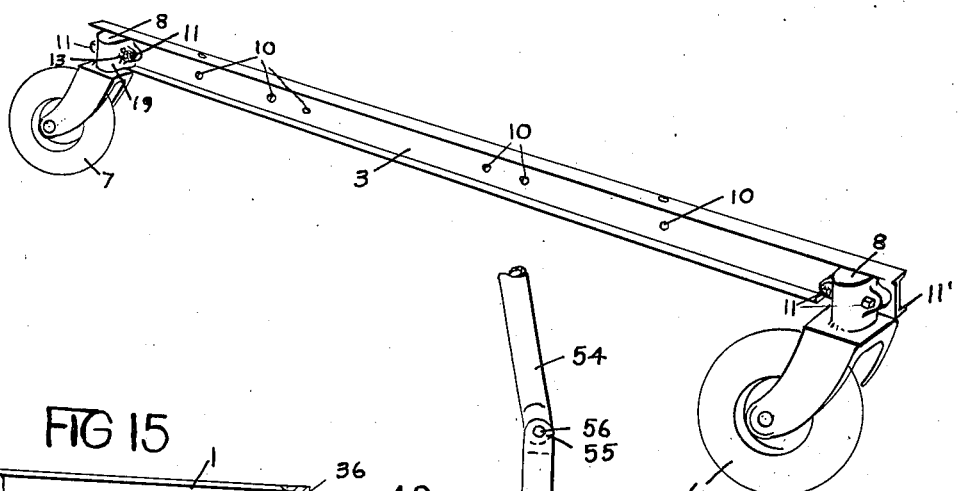
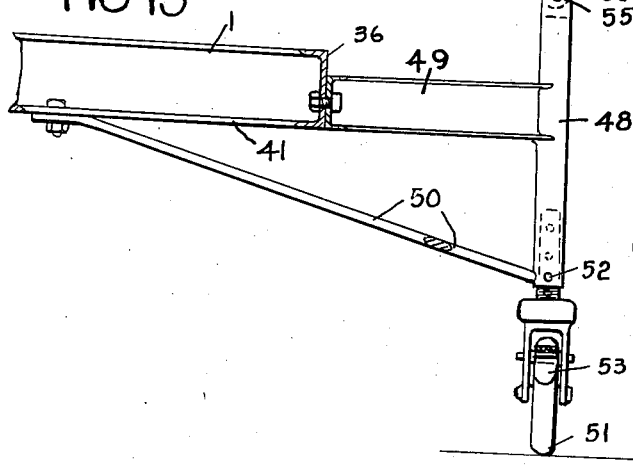
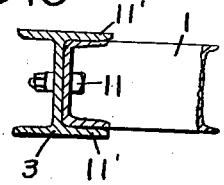
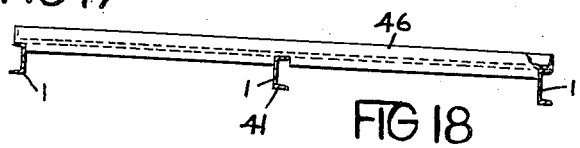
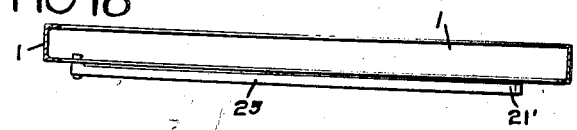
INVENTOR.
CHARLES HOHL
BY
Paul A. Talbot
ATTORNEY.

Patented Jan. 28, 1941

2,229,653

UNITED STATES PATENT OFFICE 2,229,653

TRAILER

Charles Hohl, New York, N. Y.

Application February 28, 1939, Serial No. 258,982

10 Claims. (Cl. 228—6)

My invention relates to a trailer particularly adapted to support ladders scaffolding and other devices used in construction work military purposes etc., and has among its purposes and objects to provide:

A trailer in which the wheels or supports may be quickly separated to give a larger base.

A trailer in which the wheels may be spread to more than twice the normal gauge.

A device for transporting and supporting high ladders, scaffolding and the like.

A trailer having demountable axles which may be secured to the sides of the chassis for use when in transit and to the ends of the chassis when supporting the high ladders, scaffolding etc., in their raised positions.

Axles and a chassis for supporting high top heavy ladders, scaffolding etc., in which the axles are changed in position in relation to the chassis to change the position of the wheels supporting the chassis to increase the distance between the wheels.

I accomplish these and other objects by the construction herein described and shown in the accompanying drawings forming a part hereof in which:

Fig. 1 is a plan view of my trailer assembled for transit.

Fig. 2 is a plan view of my trailer assembled for supporting high or top heavy, ladders etc.

Fig. 3 is an elevation of the assembly shown in Fig. 2.

Fig. 4 is a detail of the locking means for the rear swivel wheels.

Fig. 5 and 6 are elevations of one of the jacks.

Figs. 7, 8 and 9 are diagrammatic elevations showing the application of my device.

Figs. 10, 11 and 12 are diagrammatic plan views showing several of the ways my device may be assembled.

Fig. 13 is a detail of one of the braces.

Fig. 14 is a perspective view of one of the axles.

Fig. 15 is a detail of one of the scaffold braces.

Fig. 16 is a detail at 16—16 Fig. 1.

Fig. 17 is a detail of one of the foot pieces.

Fig. 18 is a detail of one of the swinging arms.

Similar reference characters refer to similar parts throughout the several views of the drawings and in the specification to follow.

Scaffolding and tall extension ladders have been made of standardised parts quickly assembled for work of various kinds at high elevations and inaccessible places both indoors and on the exteriors of buildings, structures etc., and some of such ladders etc., have been provided with casters or wheels to facilitate mobility and portability over sidewalks and floors and such relatively smooth surfaces usually at low speed and for short distances such as around a hall, lobby or waiting room or around the building on the sidewalk to reach and work on marquee, balconies, signs etc.

By the use of my device the use of much higher, portable ladders, scaffolds observation towers, fire ladders etc., are made pratical and by the simple construction herein set forth describing my trailer it will be seen that the relative cost may be kept low for the many uses for which it is adapted. The parts may be quickly assembled or dismembered and because of its large floor or base a greater stability and safety are available for the workmen or users. It may be quickly moved from place to place or to contractors' jobs a long distance apart using the highways, streets, roads and such arteries for transportation as are ordinarily used for automobiles and trailers of other types.

My trailer is also suitable when fitted with an observation tower and suitably camouflaged to be particularly adapted to army observation post towers as it is ordinarily built to support such devices having a height of over 50 feet and may be specially constructed for towers over 100 feet in height. In fact by the use of the underlying principles of my invention and where larger parts are used towers of several hundred feet are easily and quickly transported from place to place yet within the weight permissible over ordinary highways.

In its ordinary size the chassis is of the usual width or gauge so that the wheels track with those of an automobile. The axles however are much longer than the axles of automobiles, cars, trucks etc., and when my device is in transit or on the highway the axles are disposed longitudinally of the chassis and not transversely as in the usual practice. Thus the axles travel end wise as does the chassis with respect to the roadway.

When the destination is reached and when it is desired to raise the ladder, tower, scaffold etc., the chassis is raised on its jacks and the axles are changed to a position at or near the ends of the chassis and secured to it transversely which because of the unusual length of the axles greatly increases the distance between the wheels or "wheel base" of my trailer. The distance between the wheels in both directions is limited only by the length of the axles and the length of the chassis.

In the following specification and in the drawings I have shown one construction for the purpose of illustrating how my invention may be made. I have not attempted herein to show and describe the many modifications that are possible within the scope of my invention. I believe that numerous alternate details of construction and modifications will be apparent to those skilled in the art to which my invention pertains after a study of this disclosure without departing from the principles embodied in and underlying my invention.

I have provided a chassis 1 preferably having a length substantially greater than its width. Secured to the chassis are the axles 2 and 3 which are substantially greater in length than the width of said chassis. At or near the end of said axles I have provided the swivel wheels 4, 5, 6 and 7 so mounted as to swing or revolve about the centers 8 and permit the chassis or axles to travel or be moved in any desired direction.

In the ends and in the sides of the chassis I have provided the apertures 9 and in the axles I have provided the apertures 10 which receive the bolts or other securing means 11 to detachably secure the axles to the chassis. Both the apertures in the chassis and in the axles are positioned to permit the axles to be secured at the ends of the chassis and to be changed from the ends to the sides of the chassis.

For convenience the same bolts are suitable to secure the axles to the chassis at either or several positions as desired. The apertures in both the axles and their companion apertures in the chassis are for convenience so positioned as to match and come in alignment to receive the bolts in securing the axles to the chassis at any of the several positions as desired. The axles are thus made interchangeable with regard to the chassis in the several positions.

Standard structural shapes may be used in the construction of both the axles and chassis and the apertures in both may be so positioned as to permit the chassis to rest on the flanges 11' of the axles thereby relieving the bolts from sheering strains when the weight and other stress are applied in the operation and use of my device.

While my trailer is in transit it is desirable to lock the rear swivel wheels 5 and 7 from swinging and I have provided the removable locking pins 12 and 13 which engage the apertures 14 and 15 in the studs 16 and 17 and bearings 18 and 19 in which said studs and the wheel forks 20 secured thereto, mounting the wheels, swing or revolve. Locking the rear wheels prevents the trailer from "whipping" or swaying from side to side on the road.

The chassis and axles may be provided with the apertures 21 which receive the bolts, hooks etc., 22 which secure the ladders, scaffolds, towers, devices etc., 23 to my trailer.

The various devices 23 may be of a type and design common to use or of special construction for the particular service to which they are suited. Figs. 7, 8 and 9 show in diagram some of the devices and their arrangement in relation to my trailer.

Referring to the diagrams, shown in Figs. 10, 11 and 12, three of the most common positions used for the axles relative to the chassis may be seen.

In Fig. 11 the extended end of the axle is preferably strengthened and braced by the brackets 24. The extended positions of the swinging arms 25 are also shown. The arms 25 are provided with the apertures 21' to receive the hooks etc., to hold the ladders etc., over the space between the extended ends of the axles.

To raise the chassis when changing the axles from side to end or vice versa, I have provided the jacks 26 which are preferably swingingly secured to the underside of the chassis by the brackets 26' and the pins 27 which engage the slots 28 of said bracket permitting the top ends 29 of the jacks to rest against the under surface of the chassis when in their operating position. The jacks are prevented from tipping by the braces 30 which are swingingly mounted to the chassis by the brackets 31 and pins 32. The eyes 33 at the opposite ends of the braces engage the pins 34 between the ends of the jacks. The braces engage the pins 34 between their ends to hold the jacks in their raised position when swung up under and against the bottom of the chassis. The ends of the braces are held in the grooved projecting heads 35.

The chassis may be constructed of standard structural shapes and the side members 36 and 37 are shown as channels of a size to fit between the flanges of the axles which may be H sections or I beams and the ends of the chassis 39 and 40 may likewise be of a size to fit between the flanges of the axles. The side members are preferably held together by the ends and the cross members 41 having diagonal braces 42 secured to several of said cross members and to the side members of the chassis.

Secured to the chassis end 39 I have provided the tow member or tongue 38 preferably Y shaped and the end 43 permitted to swing up and down by the clives connections 44 detachably secured to said end 39 of the chassis. The end 43 may be fitted with the ball and socket coupling 45 which may be of the type commonly used for connecting trailers to cars.

As a footing for the ladders, scaffolding and such devices I have provided the foot pieces 46 which are preferably of H section and so cut out and detachably secured to the chassis and its cross members as to permit them to be spread longitudinally of the chassis transversely across the cross members or said foot pieces may be disposed across the chassis to the positions best suited to accommodate the various devices which may be secured to and carried by the chassis. The braces 24 may be also provided with the foot pieces 47 to receive one of the bottom ends of the devices when the trailer is assembled as shown in the diagrams of Figs. 9 and 11.

When a device is used at the side of walls and where pressure against the wall is desired I have provided the additional scaffold braces 48 which are secured to the side of the chassis nearest the wall by means of the detachable brackets 49 and the braces 50 are detachably secured to cross members 41. The scaffold braces are preferably provided with vertically adjustable swivel wheels 51 which may be locked in the desired position by the pin 52 and the wheel brake 53. The extension pipes 54 are secured at the bottom ends by the joints 55 and the removable pins 56. The top ends of said extension pipes may be secured to the scaffold or device near its top end.

I do not wish to be limited to the details of construction herein described and shown as I may wish to depart therefrom within the scope of the appended claims which set forth my invention.

I claim:

1. In a trailer, a chassis, axles detachably secured to either the ends or sides of said chassis, swivel wheels secured at the ends of said axles.

2. In a trailer, a chassis, axles securable transversely or longitudinally along the sides or along the ends of said chassis, swivel wheels secured to the ends said axles and means locking the rear one of said swivel wheels from swinging in relation to said axles when said axles are secured to the sides of said chassis.

3. In a trailer, a chassis, axles detachably secured to and disposed along the sides of said chassis, means securing said axles to and along the ends of said chassis to increase the length and width between the wheels of said trailer.

4. In a trailer, a chassis, axles detachably secured to and along the sides or ends of said chassis, devices detachably secured to and supported by said chassis and axles comprising foot pieces and bolts engaging said devices.

5. In a trailer, a chassis, axles detachably secured along the sides of said chassis while in transit and along the ends of said chassis when in operation, devices detachably secured to and supported by said chassis and axles when in operation, and means bracing said devices against side movement comprising brackets and arms swingingly secured to said chassis.

6. In a trailer, a chassis, axles detachably secured to said chassis along its sides and movable to be secured along the ends of said chassis, braces secured to said chassis and to the extended ends of said axles when positioned along the ends of said chassis.

7. In a trailer, a chassis, axles detachably secured to said chassis along its sides and movable to be secured along the ends of said chassis, jacks swingingly secured at one end to said chassis and swingable downward to take the weight of the chassis off of said axles.

8. In a trailer, a chassis, axles detachably secured thereto and movable from the sides to the ends of said chassis, jacks swingingly secured at their one end and to said chassis and swingable downward to take the weight of the chassis off of said axles and means secured to said chassis bracing said jack and supporting the other end of said jacks in their raised position.

9. In a trailer, a chassis, axles detachably secured to and movable from the sides of said chassis to the ends thereof, braces secured to said chassis and to the extended ends of said axles, an arm swingingly secured to said chassis, devices supported by said chassis and said braces and means securing said devices to said chassis engaging said arm.

10. In a trailer, a chassis, axles detachably secured to and movable from the sides of said chassis to the ends thereof, means on said axles permitting the movement of said trailer in all directions, said trailer being narrower when in transit and wider when said axles are secured to the ends of said chassis.

CHARLES HOHL.